United States Patent [19]

Carson

[11] Patent Number: 4,526,053
[45] Date of Patent: Jul. 2, 1985

[54] STABILIZED APPARATUS FOR CONVERTING ROTATIONAL MOTION TO LINEAR MOTION

[75] Inventor: William W. Carson, Mendon, Mass.

[73] Assignee: Millipore Corporation, Bedford, Mass.

[21] Appl. No.: 518,701

[22] Filed: Jul. 29, 1983

Related U.S. Application Data

[63] Continuation-in-part of Ser. No. 466,283, Feb. 14, 1983.

[51] Int. Cl.³ .............................................. F16H 1/20
[52] U.S. Cl. .............................. 74/424.8 C; 74/89.15
[58] Field of Search ...................... 74/424.8 C, 89.15

[56] References Cited

U.S. PATENT DOCUMENTS

| | | | |
|---|---|---|---|
| 2,831,363 | 4/1958 | Lohr | 74/424.8 C |
| 3,173,304 | 3/1965 | Strandgren | 74/424.8 C |
| 3,214,991 | 11/1965 | Perrin | 74/424.8 C |
| 3,226,809 | 1/1966 | Perrin | 74/424.8 C |
| 3,884,090 | 5/1975 | Dock | 74/424.8 C |

FOREIGN PATENT DOCUMENTS

| | | | |
|---|---|---|---|
| 1450848 | 4/1969 | Fed. Rep. of Germany | 74/424.8 C |
| 290685 | 6/1950 | France | 74/424.8 C |
| 737687 | 6/1980 | U.S.S.R. | 74/424.8 C |
| 832178 | 5/1981 | U.S.S.R. | 74/424.8 C |

Primary Examiner—Ronald C. Capossela
Attorney, Agent, or Firm—Andrew T. Karnakis; Paul J. Cook

[57] ABSTRACT

Apparatus is provided for converting rotational motion to linear motion which includes a screw shaft and nut surrounding the screw shaft, each having a helical thread. A plurality of threaded planetary rollers is interposed between and in contact with the threads of the screw shaft and nut. A secondary locking thread-locking threaded path system is formed on two adjacent or all of the screw shaft, nut and planetary rollers to provide stable rotation and to maintain the planetary rollers in place. The screw shaft can have the same or a different number of starts than the number of starts on the nut.

20 Claims, 9 Drawing Figures

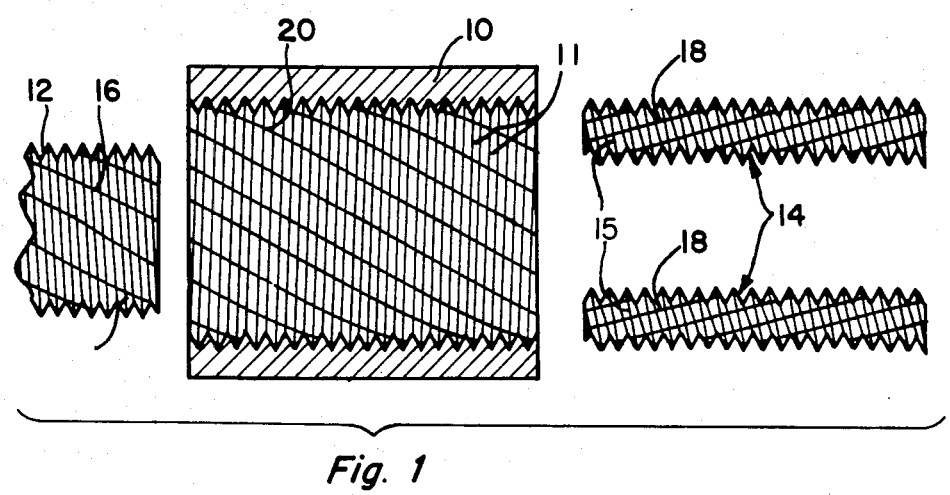
Fig. 1
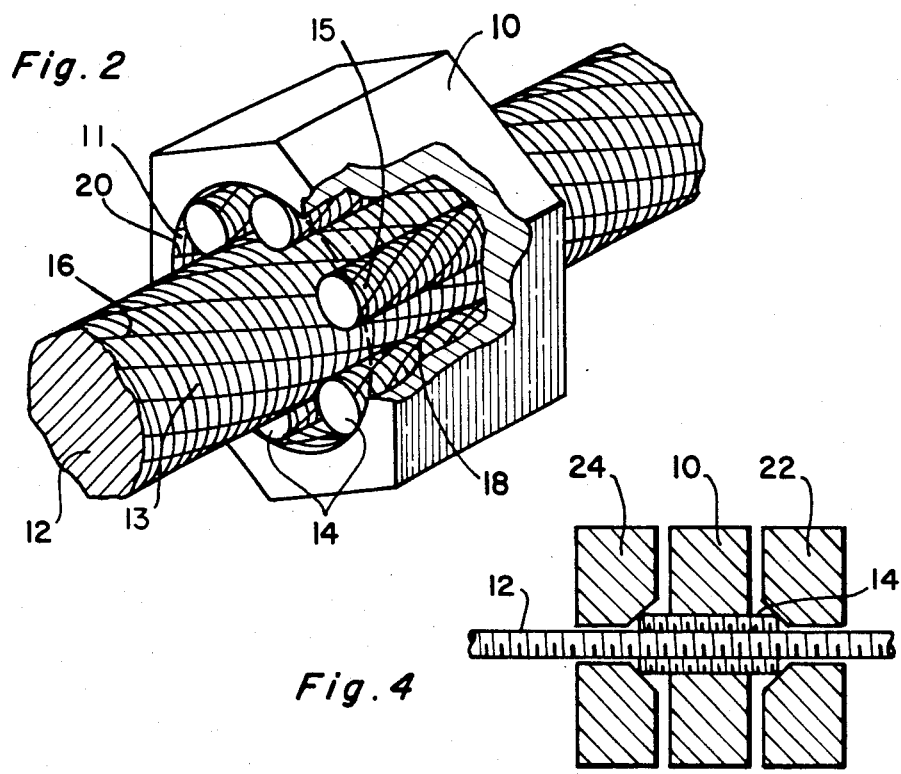
Fig. 2
Fig. 4

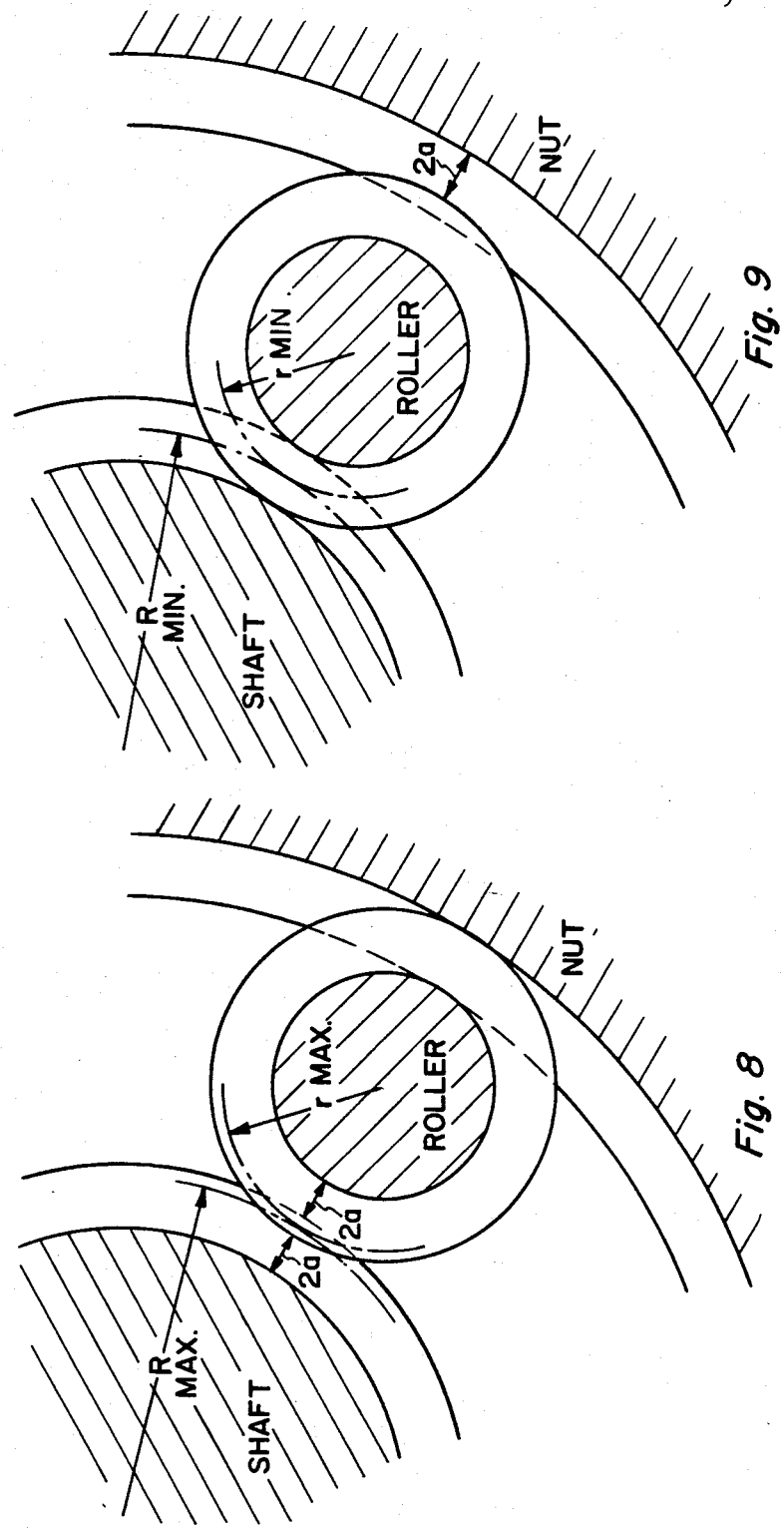

STABILIZED APPARATUS FOR CONVERTING ROTATIONAL MOTION TO LINEAR MOTION

REFERENCE TO RELATED APPLICATION

This application is a continuation-in-part of application Ser. No. 466,283, filed Feb. 14, 1983.

BACKGROUND OF THE INVENTION

This invention relates to an apparatus for converting rotational motion to linear motion which utilizes a screw shaft and a nut, both having helical threads and between which are interposed threaded planetary rollers. More particularly, the planetary rollers, and shaft and/or nut are provided with a threaded locking system to provide stabilized rotation.

Prior to the present invention, roller screw drives have been available which comprise a screw shaft axially positioned within a nut and wherein a plurality of planetary rollers are positioned between the screw shaft and the nut. The rollers mesh with a helical thread on the nut and a helical thread on the screw shaft. The helix on the nut and the screw shaft extend in the same helix direction. In addition, the shaft and the nut have the same lead (distance advanced per revolution) and the same number of starts (beginning of a helical thread). When the nut is rotated, the shaft is caused to move axially with respect to the nut and the rollers. The rollers may or may not move axially with respect to the nut. As used herein, the term "start" is defined as the beginning of a helical thread in the right-hand screw thread direction or clockwise moving away from the observer. The term "negative start" is defined herein as the beginning of a helical thread in the left-hand screw thread direction or counterclockwise moving away from the observer. The terms "helix" and "helical thread" is defined herein to include the degenerate case where a helix becomes a circle and a helical thread with zero starts is a series of equidistant grooves perpendicular to the axis of symmetry of the part. Thus, as used herein, a nut and screw will have equal starts when each has the same number of starts and the starts extend in the same direction.

Presently available roller screw drives utilize a nut and a screw having the same number of starts. In order to maintain planetary rollers having starts, within the nut during rotation, the ratio of the nut diameter to the roller diameter is made equal to the ratio of starts. In this design, additional provisions are required to maintain a non-slip condition between the rollers and the nut. This consists of spur gears cut into the ends of each roller and mating ring gears installed at each end of the nut. High gear ratios (small lead) may be obtained when utilizing a very fine thread design: i.e., a large number of threads per unit length which is impractical to produce due to the very tight tolerances. Furthermore, when utilizing a nut and screw shaft, the threads of which extend in the same helical direction, with planetary rollers having starts, a large helix angle mismatch of the shaft threads with the planetary rollers occurs which results in poor load carrying capability.

When utilizing a nut and screw shaft, the threads of which extend in the same direction with planetary rollers having no starts, it is mandatory that the rollers be recirculated; i.e., that the rollers be removed from engagement with the nut and screw shaft and be moved axially to return the planetary roller to a former position so that the roller will be retained between the nut and screw shaft during extended rotation times. This mode of operation causes radially asymmetrical static forces and radial and axial dynamic imbalances that prevents high speed rotation. Skidding of the rollers relative to the shaft and nut causes damage during quick acceleration or deceleration.

Many of the presently available roller screw drives also have the problem that the planetary rollers do not remain intrinsically spaced apart from each other during rotation. Therefore, roller cages are employed to maintain uniform roller spacing. This is necessary to provide load sharing between rollers and to prevent jamming or excessive roller to roller friction.

Accordingly it would be desirable to provide a roller screw drive which permits obtaining a high gear ratio (small lead) without the necessity of utilizing a fine thread design. Furthermore, it would be desirable to utilize a roller screw design which does not require extreme thread helix angle mismatch between the planetary rollers and the nut and screw. Also, it would be desirable to have a roller screw design that utilizes planetary rollers which does not require roller recirculation. Also it would be desirable to provide a means for maintaining the desired spaced-apart relationship of the planetary rollers of a roller screw during rotation in order to provide balanced load sharing and to prevent jamming and roller to roller friction. Also it would be desirable to simplify the design and reduce the number of parts and their cost and complexity. It would be desirable to accomplish all this without having to restrict the range of axial travel between different parts of the roller drives.

SUMMARY OF THE INVENTION

In accordance with this invention, a roller screw drive is provided which includes a secondary locking thread-locking thread path system formed on two adjacent or all of the screw shaft, nut and planetary rollers to prevent skidding and to provide stable positioning of and load sharing by the rollers. The locking threads can be positioned on the planetary rollers or nut or screw shaft or on any combination of the three components so long as there is a locking thread path on any component that contacts with the locking thread during rotation. In addition, the present invention provides a roller screw drive which is capable of employing planetary rollers without the need for planetary roller recirculation means and which can employ planetary rollers with starts while achieving high gear ratios. The roller screw drive of this invention includes a nut and screw having equal or unequal starts. By the term "unequal starts" as used herein is meant (a) the helical threads on the nut and screw shaft extend in opposite directions, (b) the absolute number of starts on the nut and screw shaft are unequal or a combination of (a) and (b) as defined above. The thread on the planetary roller can have no starts or can be helical extending in either direction. The roller screw drive of this invention can be made so that the planetary rollers do not move axially relative to the nut thereby to allow unlimited axial motion of the nut relative to the screw shaft. Alternatively, the planetary rollers can be allowed to move axially relative to the nut in combination with means for limiting the axial movement of the nut thereby to maintain the planetary rollers at least partially in place within the nut. The roller screw drive of this invention can be a fixed ratio drive or a variable ratio drive.

BRIEF DESCRIPTION OF THE DRAWINGS

FIG. 1 is an exploded cross-sectional view of the apparatus of this invention.

FIG. 2 is an isometric view of the apparatus of this invention.

FIG. 4 shows a cross-section of a continuously variable bidirectional drive suitable for use in this invention.

FIG. 8 is a simplified set of axial views of the variable speed drive of FIGS. 4 and 5 in its maximum ratio.

FIG. 9 is a simplified set of axial views of the variable speed drive of FIGS. 4 and 5 in its minimum ratio.

DESCRIPTION OF SPECIFIC EMBODIMENTS

Figure 3:
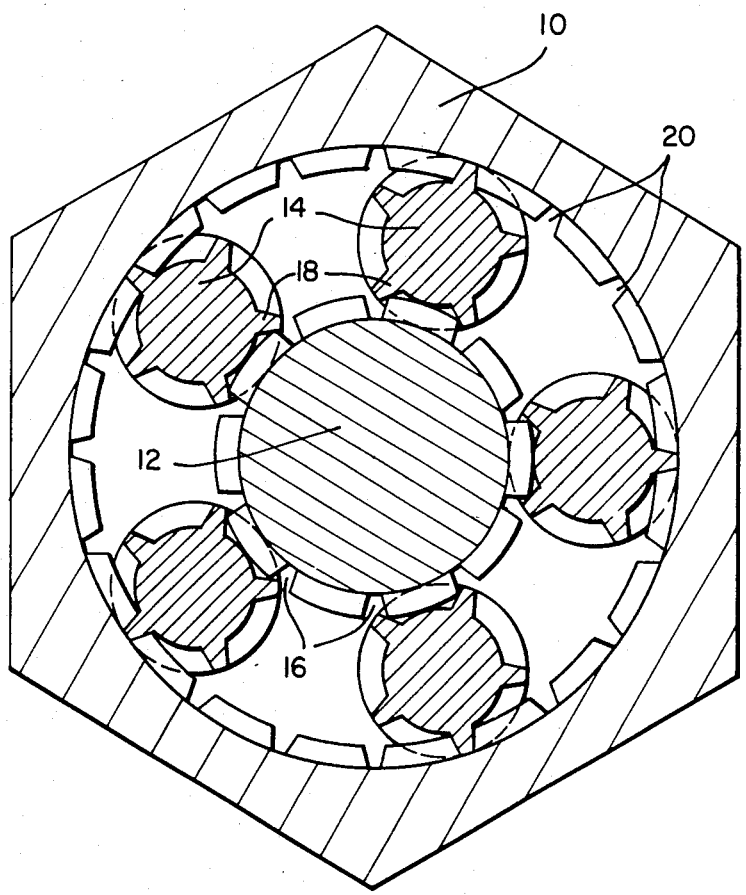
FIG. 3 is a simplified cross-sectional view of the apparatus of this invention.

The invention will be described in detail hereinafter with reference to the embodiment of this invention wherein the locking threads are located on the planetary rollers and the mating locking thread paths are positioned on the screw shaft and nut. This is an economically desirable embodiment as the rollers with their major threads and secondary locking threads can be manufactured by relatively conventional thread rolling or molding techniques. The shaft and nut do not include locking threads and therefore can be manufactured by conventional metal removal techniques by simply cutting two sets of thread paths, one creates the major thread and one makes the locking thread path. It is to be understood that the locking threads can be located on the screw shaft and/or nut which mates with locking thread paths on the planetary rollers. Alternatively, both the locking threads and the locking thread paths each can be positioned on any or all of the planetary rollers, nut and screw shaft so long as each locking thread on one of the roller screw drive components, e.g. planetary rollers, mates with a corresponding locking thread path on the other contacted roller screw drive components, e.g., nut and screw shaft. In addition, the invention will be described hereinafter with reference to the preferred roller screw drive wherein the screw shaft has a different number of starts than the number of starts on the nut.

In the present invention, an apparatus is provided for converting rotational motion to linear motion which comprises a shaft, a plurality of planetary rollers in contact with the screw shaft and a nut surrounding and in contact with the planetary rollers. The screw shaft and the nut each are provided with a helical thread which mates with the thread of the planetary rollers interposed between and in contact with the nut and the screw shaft. The helical thread extends continuously in the same direction on each of the nut, screw shaft and planetary rollers or can change direction so long as the thread is substantially helical and the direction change is matched by the threads with which it contacts during rotation. In the present invention, the signed number of starts on the screw shaft can be the same or different from the signed number of starts on the nut. In one embodiment of this invention wherein it is desired to prevent relative axial motion between the nut and the rollers, it is necessary that the helix angle of each roller be substantially the same, and that they be substantially the same as the helix angle of the nut. The helix angle is determined by the thread lead (axial distance along the shaft per revolution of the nut) and the pitch diameter (diameter of the thread where no skidding occurs between adjacent contact of rolling members). The numbers of threads per inch of the nut and the roller and shaft must be the same in order for them to mesh. The pitch diameter of the nut is a number times the pitch diameter of the roller and for no axial motion of the roller relative to the nut this number is a simple fraction and comprises the ratio of the number of starts (beginnings of the helix) on the nut to starts on the roller. Generally, this number is between about 2 and about 500, preferably between about 3 and about 20.

The screw shaft and roller both have external threads. Therefore, when using roller threads having helix angles equal to but of opposite sign to the helix angle of the screw shaft thread, there is no relative axial motion between the screw shaft and the rollers during rotation. Note when the screw shaft is provided with a helix angle which added to that of the rollers is non-zero, axial motion of the shaft relative to the rollers will occur when the nut is rotated. A very small helix angle sum will result in a very small axial motion per revolution of the nut while a large helix angle sum between the rollers and the screw shaft results in a large axial motion per revolution. The helix angle ($\alpha$) of the screw shaft pitch diameter ($D_{sp}$) in combination with the threads per inch (T) on the screw shaft determines the number of the starts ($S_s$) on the shaft in accordance with the formula:

$$S_s = T \cdot \text{thread lead} = T \cdot \pi D_{sp} \cdot \tan \alpha \qquad (1)$$

The number of starts is an integral number and if the pitch diameter is constrained, the helix angles available are discrete.

The planetary rollers must simultaneously mesh with both the screw shaft and the nut. When the signed number of starts of the shaft ($S_s$) and nut ($S_n$) are not equal, the radial projections of the threads of the shaft and the nut crisscross each other. A roller with an odd number of starts has a high point of its thread 180° opposite a low point of its thread. Such a roller can only mesh simultaneously with the shaft and the nut when a shaft high point crosses a nut low point. (Rollers with an even number of starts where the shaft and nut high points cross.) There is only one such roller position per thread crossing. The maximum number of allowable roller positions $N_{rmax}$ is, therefore, the difference between the signed number of starts of the nut and the shaft:

$$N_{rmax} = |S_n - S_s| \qquad (2)$$

These allowable roller positions are equally spaced around the shaft. With the degenerate case of equal number of starts of shaft and nut, i.e., difference equals zero, either zero or an infinite number of roller positions is allowable depending on the axial position (thread alignment) of the shaft relative to the nut. When it is desirable to have no axial motion of the roller with respect to the nut, the pitch diameter of the nut ($D_{np}$) must be a simple fraction (F) of the roller pitch diameter ($D_{rp}$) with the nut starts ($S_n$) being that simple fraction (F) times the number of roller starts ($S_r$) in accordance with the following mathematical relationships:

$$D_{np} = F \cdot D_{rp} \tag{3}$$

and:

$$S_n = F \cdot S_r \tag{4}$$

When this criteria is met, the nominal shaft pitch diameter therefore has been specified as the nut pitch diameter minus two times the roller pitch diameter:

$$D_{sp} = D_{np} - 2D_{rp} \tag{5}$$

Ratios slightly different from these discretely defined ratios can be obtained by making the actual pitch diameter different from its nominal value by slight skidding of the rollers. In effect, the pitch diameter of the roller in contact with the nut can be made different from the pitch diameter of the roller in contact with the shaft. This results in having two different helix thread angles on the roller with the screw shaft meshing with one angle and the nut meshing with a different angle of the roller. Such small variations in the pitch diameter are achievable by changing the location of the no-skid point in the contact patch. This can be achieved by applying a force to the planetary rollers by any convenient means such as mechanically, magnetically, etc.

Providing means to continuously vary the instantaneous pitch diameter allows a continuously variable speed drive to be built by causing the rollers to run closer to or further from the screw shaft axis. One embodiment is achieved by utilizing a means such as a cone at each end of the rollers to force the rollers toward the shaft, and by using inertial force or radially imbalanced resultant forces to move them away from the shaft. When a continuously variable speed drive is based on nominally matching the helix angle of the screw shaft with that of the roller, it is bidirectional.

The fixed ratio and variable ratio roller screw constructions described above are all forms of traction drives which have no constraint against skidding. The assumption is made that the no skid point in the contact patch will be at the nominal pitch diameter. When such a device is built and run, the instantaneous actual pitch diameter or point of no skid contact varies with precise geometry of the thread, with lubrication, with speed, with loading, and with acceleration. This causes the individual instantaneous pitch diameters to vary slightly, resulting in axial motion of one roller relative to another and relative to the nut. After extensive running, these errors accumulate and are not necessarily self-cancelling. It is therefore desirable in many cases to constrain the actual pitch diameter to the theoretical pitch diameter. This can be accomplished by gearing the roller to the nut and/or shaft. For axial motion of limited excursion, this can be accomplished by adding a gear which engages with a similar gear on both ends of the shaft and/or internal gear on the nut. In variable speed designs, the rollers should be engaged to the nut or the shaft, but not both as varying the actual pitch diameter is the source of ratio variation. When engaging the nut, this can be accomplished by cutting teeth on the end of the rollers and adding a toothed gear to each end of the nut.

The locking thread-locking thread path system which constitutes the basis of the instant invention is in the form of secondary thread(s) and secondary thread path(s) which can intersect the primary threads and primary thread paths on the nut, screw shaft and or planetary rollers. The secondary thread(s) and secondary thread paths can be parallel to the screw shaft axis or can be in the helical form concentric with the screw shaft axis. All that is necessary is that the secondary thread(s) mate with secondary thread path(s) during rotation. The locking threads function to prevent skidding between interlocked elements without imposing additional relative axial motion restrictions between elements, the locking threads also function to maintain the axis of the planetary rollers parallel to the axis of the device. The planetary rollers are also maintained properly spaced apart from each other, if the locking thread-locking thread path system is used between all elements of the drive (nut, rollers and shaft).

The fundamental requirement of the locking thread-locking thread path system is that it partially or fully constrain but not overconstrain the mechanism. Specifically, to prevent binding the locking thread must engage a corresponding locking thread path of any element it meshes with. The circumferential distance between locking threads as measured along the no skid pitch diameter should be the same as the corresponding distance between the locking thread paths that this thread engages.

For the case of rollers of pitch diameter, $D_{rp}$ having locking threads with $S_{ltr}$ equally spaced starts which engage a nut of pitch diameter $D_{np}$ the number of locking thread path starts on the nut ($S_{ltpn}$) must be at least:

$$\frac{2\pi D_{rp}}{S_{ltr}} = \frac{2\pi D_{np}}{S_{ltpn}} \tag{6}$$

Rearranging:

$$S_{ltpn} = \frac{D_{np} \cdot S_{ltr}}{D_{rp}} \tag{7}$$

Similarly, to mesh with the screw shaft (of pitch diameter $D_{sp}$), the number of locking thread path starts on the screw shaft $S_{ltps}$ must be at least:

$$S_{ltps} = \frac{D_{sp} \cdot S_{ltr}}{D_{rp}} \tag{8}$$

combining with Equation (5) gives:

$$S_{ltps} = \frac{(D_{np} - 2D_{rp}) \cdot S_{ltr}}{D_{rp}} \tag{9}$$

In the fully constrained case, the rollers' locking threads simultaneously mesh with both the nut and the screw shaft locking thread paths. For a given shaft and nut position, this restricts rollers to only those circumferential locations that allow this simultaneous meshing. The number of acceptable positions for rollers that is imposed by this locking thread constraint $N_{ltc}$ is equal to the total number of locking thread paths:

$$N_{ltc} = |S_{ltps}| + |S_{ltpn}| \tag{10}$$

Combining Equation 10 with Equations 7 and 9 gives:

$$N_{ltc} = 2\left(\frac{D_{np}}{D_{rp}} - 1\right) S_{ltr} \quad (11)$$

The $N_{ltc}$ allowable roller locations are positioned at equal spacing around the circumference of the shaft. Only those locations which simultaneously satisfy the locking thread constraints (Equation 11), the primary thread constraints (Equation 2) and do not partially overlap each other can be occupied. The number of locking thread starts on the roller $S_{ltr}$ can then be chosen to have both $N_{rmax}$ and $N_{ltc}$ integrally divisible by the desired number of rollers. It is to be understood that this example is only representative of this invention and is not intended to limit the invention.

Designs for high load carrying generally want to maximize the number of rollers to share the load and want to maximize their primary thread area available to carry this load. Because the locking thread takes away this primary thread area, it is desirable to also minimize the number of locking thread starts $S_{ltr}$. Making the locking threads helical allows minimizing $S_{ltr}$ while maintaining continuous locking thread-locking thread path engagement.

One of the major benefits in many implementations of the instant invention is the ability to provide the locking action at all relative axial positions of the components. No additional restrictions on axial travel need be made by or for the locking mechanism.

This roller drive concept is applicable to any linear motion producing system which is actuated by a rotary motion. Applications include any apparatus that utilizes ball screws or roller screws. For example, automotive steering gears, large valves in the petrochemical industry, reciprocating pumps, numerical control equipment and aircraft control surfaces such as flaps. Other applications include those for which ball screws and roller screws are currently too expensive. Large volume applications include electric windows for automobiles, electric seat adjustment of automobiles, jacks and floppy disk head drives.

Referring to FIGS. 1, 2 and 3, the apparatus of this invention includes a nut 10, a screw shaft 12 and a plurality of planetary rollers 14 interposed between and in contact with the nut 10 and the screw shaft 12. (In FIG. 3, the leads of all threads have been omitted to increase clarity).

The five rollers 14 each have one right hand primary thread start 15, and five left hand helical locking thread starts 18. The shaft pitch diameter is approximately twice that of the rollers. The shaft 12 has one left hand primary thread start 13 and ten right hand helical locking thread path starts 16. The nut pitch diameter is four times that of the rollers. The nut 10 has four right hand primary thread starts 11 and twenty left hand locking thread path starts 20. Because of the selection of pitch diameters and number and direction of starts, when the nut 10 is rotated, it does not move axially relative to the planetary rollers 14. However, both the nut 10 and planetary rollers 14 move axially as a single unit relative to the screw shaft 12. Furthermore, when the screw shaft 12 is rotated while the nut 10 is fixed, the screw shaft moves axially relative to the planetary rollers and the nut 10.

The instant invention can function with only one roller if external means such as a bearing are provided to keep the shaft and nut concentric. In order to provide balanced forces during rotation of the screw shaft 12 relative to the nut 10, at least two planetary rollers 14 are required. When supporting side loads at least three planetary rollers are desirable in order to obtain smooth rotation independent of locking thread-locking thread path backlash. The optimum number of rollers is dependent upon the expected loads, the diameter of the nut and screw shaft the desired lead and upon the size of planetary roller used.

Figure 5:
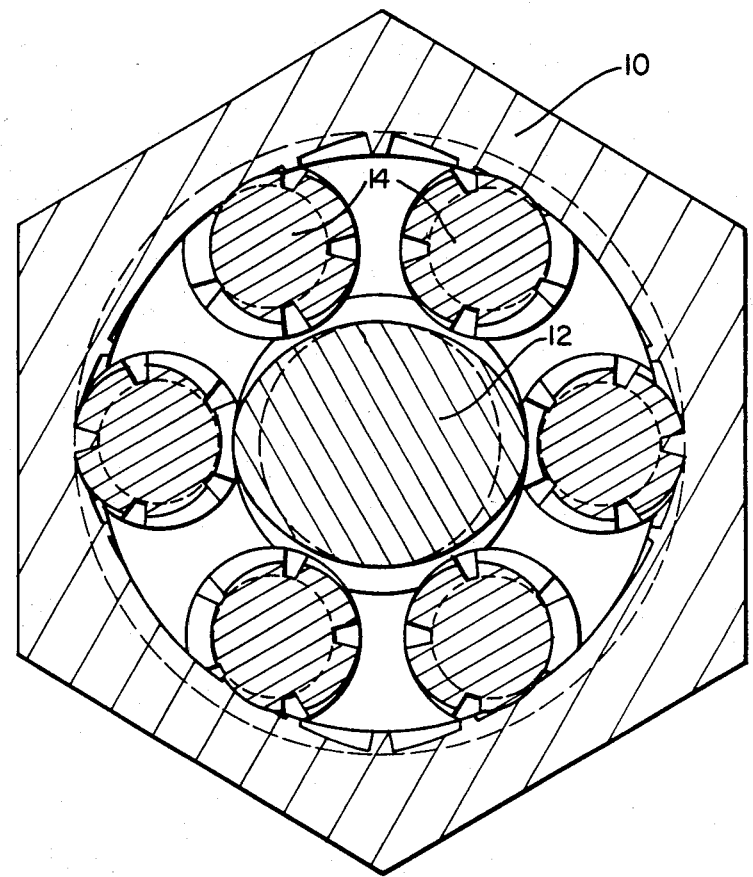
FIG. 5 is an axial cross-section view of the apparatus shown in FIG. 4.

Referring to FIGS. 4 and 5, a continuously variable bidirectional drive apparatus is shown. FIG. 5 is a true cross section including the effect of thread leads. The apparatus includes: a nut (10) having four primary right hand thread starts and twenty secondary locking threads with left hand starts; six planetary rollers (14) each having one primary right hand thread start and five secondary left hand locking thread path starts; and a screw shaft (12) having two primary left hand thread starts and no secondary threads or thread paths. Because the roller locking thread paths are female, the roller and shaft can freely roll together and because the shaft has no locking threads to prevent skidding relative to the rollers, their actual instantaneous pitch diameters relative to each other are not rigidly specified. Cones 22 and 24 are provided at opposite ends of the planetary roller 14 which can be utilized to move the planetary rollers 14 towards the shaft 12. This causes the actual pitch diameter of the shaft to change, and the roller pitch diameter in contact with the shaft to change. Note that the nut and roller to nut pitch diameters remain constant due to the gear mesh constraints. Alternatively, the cones can be removed from contact from the planetary rollers 14 so that their inertial force moves them away from contact with the screw 12.

Figure 6:
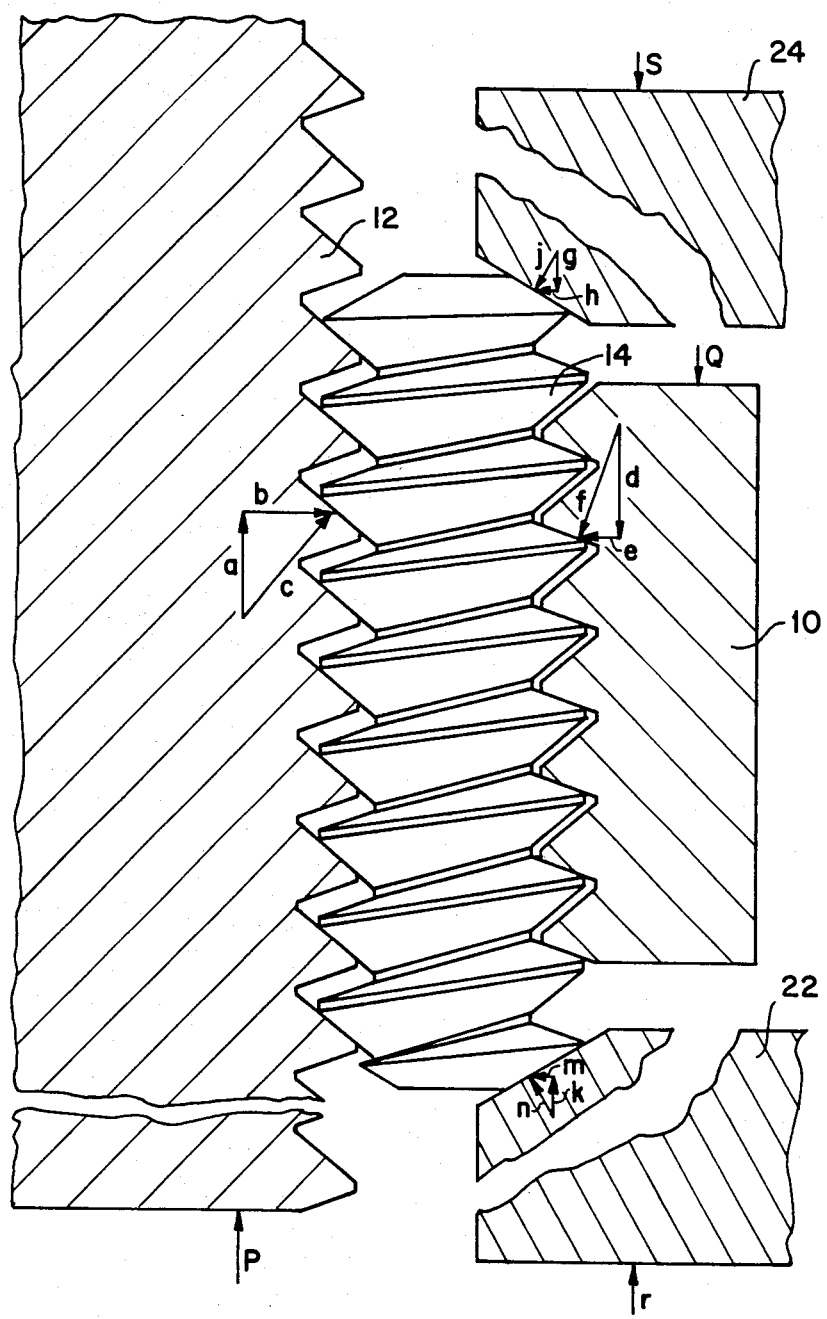
FIG. 6 is a simplified partial cross-sectional view of one version of the apparatus of FIG. 4 showing the simplied axial and radial forces that exist among the different components. For clarity, the locking thread of the nut and the corresponding locking thread path on the roller have been omitted.

Referring to FIG. 6, (shown without secondary locking threads or secondary locking thread paths), the two cones 22 and 24 can be pushed together, shown as Forces s and r, which causes the roller 14 to be forced toward the central shaft 12. Later in this description it will be shown that this results in a change in effective gear ratio to the linear drive. When the cones 22 and 24 are allowed to separate, the rollers 14 move away from the central shaft 12. This can be accomplished by inertial forces, resultant force vectors, by a second set of cones (now shown) or by other mechanisms such as magnetic attraction, etc. When the nut 10 is continuously spinning and the shaft 12 does not rotate, as in the case of an induction motor concentric around the nut 10, the rollers 14 are continuously moving around shaft 10, and a radial constraining force may be applied by the cones 22 and 24 to control the radius of their circular orbits. Separating the cones 22 and 24, therefore, results in the rollers 14 moving outward, away from the shaft 12. FIG. 6 shows an example of using resultant forces to separate the roller 14 from the shaft 12 and cause it to follow the cones 22 and 24 when the cones are separated. This design example is suitable for bidirectional motion but only unidirectional force. Use of inertial restoring forces with symetrical thread profiles would allow bidirectional motion and bidirectional forces. The thread shown in FIG. 6 is not symmetrical. When the linear drive delivers a force, p, from the shaft to the load, which is carried through the rollers 14 to the nut 10 and balanced by force Q, there are side forces developed against the roller 14. Assuming, for the moment, frictionless surfaces to simplify this explanation, the force p is transferred to the roller 14 as force a, but since the force should be normal to the thread surface, it is the vector force c which is made up of the axial component a and the radial component b. This same force must be transferred from the roller 14 to the nut 10, and the magnitude of force d must, therefore, be equal to the magnitude of force a. Force d is derived from the normal force f, which has also a radial component e, which is significantly smaller than the radial component of the shaft force which is labeled b. Therefore, there is a net force on the roller 14 away from the shaft 12 which is balanced by the cone forces j and k. The cones 22 and 24 are merely a control force where s is equal to r, and the sole function of the cones 22 and 24 is to move the roller 14 toward the shaft 12 or allow it to move away from the shaft 12. These are just two examples of many ways in which the rollers 14 can be moved toward or away from the shaft 12 while still allowing their freedom of rotation.

Figure 7:
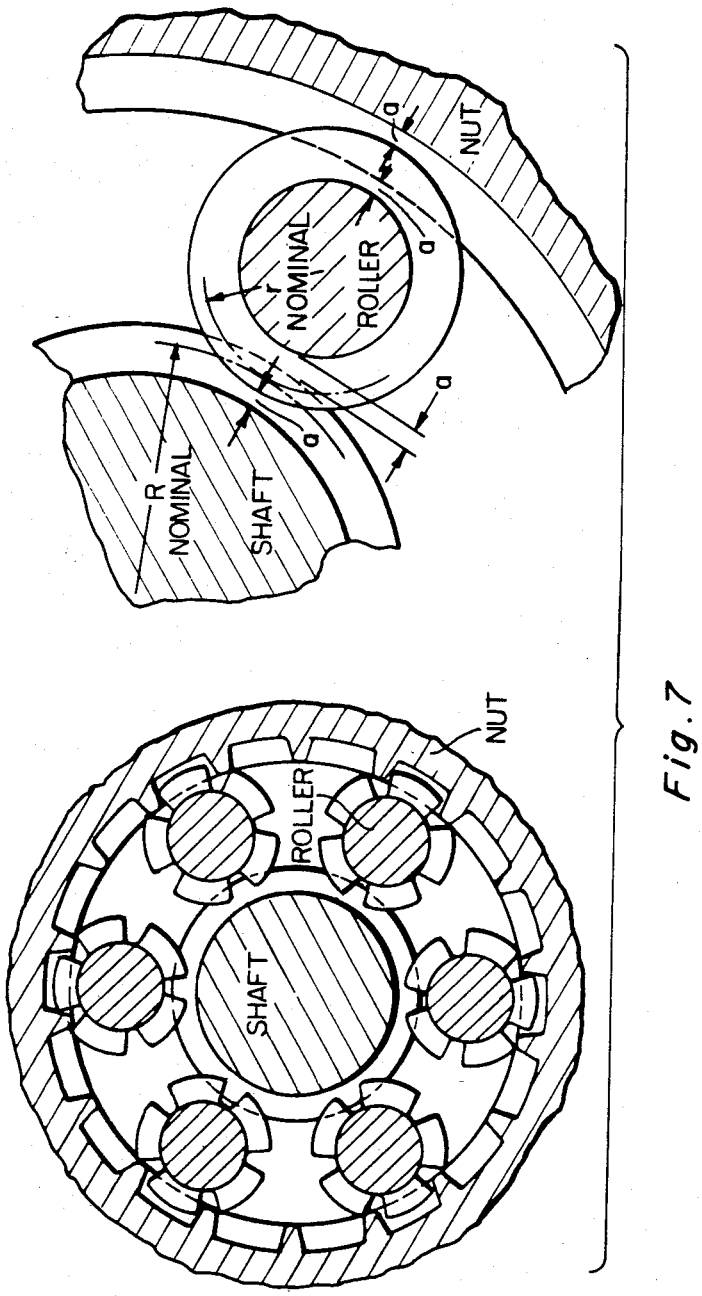
FIG. 7 is a simplified set of axial cross-sectional views of the variable speed drive of FIGS. 4, 5 and 6 in its nominal ratio. For clarity, the leads of the primary threads have been omitted and in 6b the locking thread and locking thread path have also been omitted.

In this description of FIGS. 7, 8 and 9, the nominal pitch radii were selected to result in no axial motion of the nut and roller assembly with respect to the shaft. By changing this nominal ratio larger or smaller, a bidirectional drive is therefore achieved in which the nut moves toward the viewer or away from the viewer, depending upon the direction of the deviation from nominal ratios. The rollers are locked to the nut by the nut's male gear teeth and the roller's female gear teeth. This constrains their actual pitch diameters to be the same as their nominal pitch diameters, and because their nominal pitch diameters and number of starts meet the necessary criteria, the rollers and nut have no axial motions relative to each other. Therefore, the imaginary center point of the pair of cones is always in the same position relative to the nut. By making the shaft nominal radius twice the nominal radius of the roller and having the shaft two starts and the roller one start in opposite helical directions, there is a nominal zero axial motion between the roller and the shaft. This is represented in FIG. 7, and there is a radial clearance between both the roller and nut and the roller and shaft of distance a. The nominal gear ratio is 2, which results in no axial motion.

$$\text{ratio} = \frac{R_{nominal}}{r_{nominal}} = 2 \quad (12) \text{ (Fig. 7)}$$

In FIG. 8, the rollers are moved as far away from the shaft as is possible. There is a minimal overlap between the shaft thread and the roller thread. For purposes of this discussion, the actual pitch point of no slip will be assumed to be in the center of the overlap region. Therefore, $R_{max}$ is larger than $R_{nominal}$ by an amount a/2 for the displacement of the roller major diameter by an amount a. The reduction in overlap is a total of a, and this contribution to the max radii is a/2 for both the roller and the shaft. Therefore:

$$R_{max} = R_{nominal} + a/2 = 2r_{nominal} + a/2 \quad (13)$$

Similarly, Equation $$r_{max} + r_{nominal} + a/2 \quad (14)$$

Using these equations to solve for the gear ratio in FIG. 8.

$$\text{ratio} = \frac{R_{max}}{r_{max}} = \frac{2r_{nominal} + a/2}{r_{nominal} + a/2} = \frac{a/2}{r_{nominal} + a/2} \quad (15)$$

results in a ratio which is less than that of FIG. 7. Therefore, there is axial motion between the shaft and the combined roller nut cone assembly. Solving similarly for FIG. 9.

$$R_{min} = R_{nominal} - a/2 = 2r_{nominal} - a/2 \quad (16)$$
$$r_{min} = r_{nominal} - a/2 = r_{nominal} - a/2 \quad (17)$$

$$\text{Fig. 9 ratio} = \frac{R_{min}}{r_{max}} = \frac{2r_{nominal} - a/2}{r_{nominal} - a/2} = \quad (18)$$

$$2 + \frac{a/2}{r_{nominal} - a/2}$$

gives a ratio that is greater than two. These derivations assumed the no slip point (actual instantaneous pitch radius) is at the center of the contact patch between the roller and shaft. In practice this no slip point will move depending upon the load the shaft is delivering as well as details of geometry and friction properties. Therefore, this derivation should be treated as an elucidation of the general principles of operation rather than a rigorous mathematical treatment.

This embodiment of the continuous variable speed drive had a nominal zero shaft motion per nut rotation. Therefore, varying the ratio about this point results in a bidirectional drive. This could be very useful in applications involving a one-direction roughly constant speed meter motor, such as an induction motor where a bidirectional control of axial motion is needed. Other applications might require a variable speed about a given ratio and would not necessarily be bidirectional ratios. This is achieved by selecting the correct number of starts and diameters in the same manner as described earlier.

This continuously variable speed drive can result in very sizable acceleration rates since all the moving elements (rollers and nut plus primary drive means such as motor) all run at approximately the same speed and kinetic energy storage nearly independent of the instantaneous gear ratio. The nut and motor speed are truly independent of the instantaneous ratio.

I claim:

1. Apparatus for converting rotational motion to linear motion which comprises a screw shaft having a primary screw shaft thread, a nut surrounding said screw shaft, said nut having an inner surface and a primary nut thread on said inner surface, at least one planetary roller having primary threads, means to maintain said nut and screw shaft concentric, said planetary rollers being interposed between and meshing with said primary nut helical thread and said primary screw shaft thread, said planetary rollers and at least one of said nut or screw shaft having a secondary locking thread or secondary locking thread path, said secondary locking thread or secondary locking thread path intersecting the primary thread path on said planetary rollers and at least one of said screw shaft or nut and secondary locking thread being positioned to fit only with a locking thread path during rotation of said planetary rollers.

2. The apparatus of claim 1 wherein said secondary locking threads are located on said planetary rollers and said secondary locking thread paths are positioned on said nut and screw shaft.

3. The apparatus of claim 1 wherein said secondary locking threads are located on said nut or said screw shaft or nut and screw shaft and said locking thread paths are located on said planetary rollers.

4. The apparatus of claim 1 wherein said secondary locking threads and said secondary locking thread paths are located on said nut, screw shaft and planetary rollers.

5. The apparatus of claim 1 wherein said primary nut thread has a different number or direction of starts than the starts on the primary screw shaft thread.

6. The apparatus of claim 1 wherein the means for maintaining said nut and screw shaft concentric consists of a plurality of said planetary rollers.

7. The apparatus of claim 1 wherein the thread on said screw shaft has at least one start.

8. The apparatus of claim 1 wherein the thread on said nut has at least one start.

9. The apparatus of claim 1 wherein the threads on said planetary rollers have at least one start.

10. The apparatus of claim 1 wherein the thread on said screw shaft has no starts.

11. The apparatus of claim 1 wherein the thread on said nut has no starts.

12. The apparatus of claim 1 where the threads on said planetary rollers have no starts.

13. Apparatus for converting rotational motion to linear motion and for varying the conversion ratio from rotational to linear which comprises a screw shaft having a primary screw shaft thread, a nut surrounding said screw shaft, said nut having an inner surface and a primary nut helical thread on said inner surface, at least one planetary roller having threads interposed between and meshing with said nut helical thread and said screw shaft thread, means for maintaining said nut and screw shaft concentric, said planetary roller having a secondary locking thread path, said secondary locking thread path intersecting the primary thread path on said planetary rollers and one of said screw shaft or nut having a secondary locking thread and said secondary locking thread being positioned to fit only with a locking thread path during rotation of said planetary rollers, and means for changing the effective pitch diameter of said planetary roller while said planetary rollers are rotating.

14. The apparatus of claim 13 wherein the means for maintaining said nut and screw shaft concentric consists of a plurality of said planetary rollers.

15. Apparatus for converting rotational motion to linear motion and for varying the conversion ratio from rotational to linear which comprises a screw shaft having a primary screw shaft thread, a nut surrounding said screw shaft, said nut having an inner surface and a primary nut helical thread on said inner surface, at least one planetary roller having threads interposed between and meshing with said nut helical thread and said screw shaft thread, means for maintaining said nut and screw shaft concentric, said planetary roller having a secondary locking thread path, said secondary locking thread path intersecting the primary thread path on said planetary rollers and one of said screw shaft or nut having a secondary locking thread said secondary locking thread intersecting the primary thread of said screw shaft or said nut, and said secondary locking thread being positioned to fit only with a locking thread path during rotation of said planetary rollers, and means for changing the effective pitch diameter of said planetary roller while said planetary rollers are rotating.

16. Apparatus of any one of claims 13 or 15 wherein the helix angle of each planetary roller in contact with the nut is substantially equal to the helix angle of the nut, the adjustable range of the signed sum of the effective helix angles of the planetary rollers in contact with the screw shaft includes sums both greater than and less than zero, and the secondary locking thread is located on said nut.

17. Apparatus for converting rotational motion to linear motion which comprises a screw shaft having a primary screw shaft thread, a nut surrounding said screw shaft, said nut having an inner surface and a primary nut thread on said inner surface, at least one planetary roller having primary threads, means for maintaining said nut and screw shaft concentric, said planetary rollers being interposed between and meshing with said primary nut helical thread and said primary screw shaft thread, said planetary rollers having a secondary locking thread, said nut having a secondary locking thread path, said screw shaft having a secondary locking thread path intersecting the primary thread path on said screw shaft and secondary locking thread being positioned to fit only with the locking thread paths during rotation of said planetary rollers.

18. Apparatus of any one of claim 1, 2, 13, 15 or 17 wherein the helix angle of each planetary roller is substantially equal but opposite to the helix angle of the screw shaft.

19. Apparatus of any one of claim 1, 2, 13, 15 or 17 wherein the helix angle of each planetary roller is substantially equal to the helix angle of the nut.

20. Apparatus of any one of claim 1, 2, 13, 15 or 17 wherein at least three planetary rollers are utilized.

* * * * *